United States Patent [19]

Espenhain

[11] Patent Number: 5,191,701
[45] Date of Patent: Mar. 9, 1993

[54] METHOD FOR THE AUTOMATED MANUFACTURE OF WOUND ELECTRICAL COMPONENTS BY CONTACTING THIN INSULATED WIRES TO TERMINAL ELEMENTS ON THE BASIS OF LASER WELDING

[75] Inventor: Manfred Espenhain, Heidenheim, Fed. Rep. of Germany

[73] Assignee: Siemens Matsushita Comp. GmbH & Co. KG, Fed. Rep. of Germany

[21] Appl. No.: 802,048

[22] Filed: Dec. 3, 1991

[30] Foreign Application Priority Data

Dec. 11, 1990 [DE] Fed. Rep. of Germany ....... 4039527

[51] Int. Cl.⁵ .................. B23P 17/00; H01F 7/06; H01R 43/02
[52] U.S. Cl. ......................... 29/605; 29/840; 29/843; 29/854; 29/412; 228/173.5; 228/179; 219/121.64
[58] Field of Search ................ 29/605, 840, 843, 850, 29/854, 412; 228/179, 4.5, 173.5; 219/121.14, 121.64

[56] References Cited

U.S. PATENT DOCUMENTS

| | | | |
|---|---|---|---|
| 652,607 | 6/1900 | Hanks | 228/173.5 |
| 3,231,797 | 1/1966 | Hoch | 29/840 |
| 3,610,874 | 10/1971 | Gagliano | 219/121.64 |
| 3,718,968 | 3/1973 | Sims et al. | 219/121.64 |

FOREIGN PATENT DOCUMENTS

| | | |
|---|---|---|
| 0200014 | 4/1986 | European Pat. Off. . |
| 3307773 | 9/1984 | Fed. Rep. of Germany . |
| 3518651 | 11/1986 | Fed. Rep. of Germany . |
| 118367 | 5/1989 | Japan .................. 228/179 |

*Primary Examiner*—P. W. Echols
*Attorney, Agent, or Firm*—Hill, Steadman & Simpson

[57] ABSTRACT

In a method for automated manufacture of wound electrical components by contacting thin insulated wires to terminal elements on the basis of laser welding, only the terminal element is melted by direct laser irradiation to form a welding spot at the location provided for the welding. The wire is subsequently embedded into the welding spot as soon as the welding spot has cooled to such an extent that the wire subsequently only melts superficially. During the course of continuous winding of winding carriers, the insulated winding wire is wound into the welding spot produced on the respective terminal element, and is thereby pressed by the winding tension into the melt which solidifies to form the welded connection.

14 Claims, 1 Drawing Sheet

METHOD FOR THE AUTOMATED MANUFACTURE OF WOUND ELECTRICAL COMPONENTS BY CONTACTING THIN INSULATED WIRES TO TERMINAL ELEMENTS ON THE BASIS OF LASER WELDING

BACKGROUND OF THE INVENTION

The invention is directed to a method for the automated manufacture of wound electrical components by contacting thin insulated wires to terminal elements on the basis of laser welding.

A method of this type wherein the laser welding is undertaken indirectly by irradiation of a lamina placed onto the wire is disclosed by German Published Application 33 07 773, incorporated herein.

In electrical components such as, for example, in relays, coils, transformers and other components, the induction coils employed therein are becoming smaller and smaller within the framework of a continuing miniaturization. This means that the winding wires thereby utilized have a smaller and smaller diameter, this makes the contacting of the coil terminals more difficult. For example, the lacquer-insulated winding wires can have a diameter in the range from 30 through 100 $\mu$m (0.03 through 0.1 mm).

Up to now, lacquer-insulated winding wires were usually contacted to coil terminals by resistance, ultrasound or laser welding. The softening of wire and terminal during the welding process is thereby a function of the temperature that is produced by energy application, heat capacity, and heat elimination. The various welding processes particularly differ in how the energy is supplied to wire and terminal. Heat capacity and heat elimination of wire and terminal, by contrast, are independent of the welding process—in a first approximation—and are respectively lower at the winding wire than at the terminal.

In resistance welding wherein both electrodes contact the winding wire, the heat generating occurs in the winding wire and not in the terminal onto which the heat is transmitted by thermal conduction. The chronologically earlier heating of the winding wire in comparison to the terminal is therefore caused by earlier application of energy to the winding wire, lower heat capacity, and lower heat elimination. The earlier heating and, thus earlier softening of the winding wire and the pressing power of the electrodes then lead to great deformation of the winding wire given little deformation of the terminal. In resistance welding, moreover, the electrodes in the case of miniaturized components such as, for example, SMD coils, must have such small dimensions that their service life is too short for automated manufacture. Further, the contamination of the electrodes by lacquer residues deriving from the winding wire is disturbing.

In ultrasound welding, the sonotron pressure not only produces the welding pressure but simultaneously causes the friction that generates the heat. Due to the lower heat capacity and the lower heat elimination, the wire softens earlier than the terminal. The ultrasound oscillation acting on the softened wire deforms the winding wire to an even greater degree than does resistance welding. In ultrasound welding of lacquer-insulated wires having a diameter below 0.4 mm, an additional cover lamina is welded on (sandwich technique) for mechanically reinforcing the weld, or the weld is covered with glue (see European Patent 0 200 014, incorporated herein). The mechanical reinforcement of the weld is required since the wire deforms greatly during welding and its mechanical stability thereby decreases. The electrical reliability of the winding contacting is likewise diminished due to the deformation.

In laser welding, German Published Application 33 07 733, incorporated herein discloses that copper wire microfinish enamel cannot be directly welded to the terminal element. Given direct irradiation of the winding wire by the laser beam, the wire would also have to absorb the energy that is required for softening the terminal. The wire, however, thereby melts or evaporates before the terminal softens, so that a usable winding contacting does not result. In order to avoid this, the laser energy is not directly supplied to the joining zone but to the surface of a lamina that covers the wire and the terminal (sandwich technique). In laser welding with a sandwich technique, the cover material softens first, then the winding wire and, finally, that part of the terminal to be contacted. The cover material is melted, flows over the wire to the terminal contact, completely dissolves the wire, and forms a welded bridge between wire and terminal. Analogous to a soldered connection, the boundary surface between melt and non-melted wire is critical for the contacting. Since the wire fully dissolves in an undesirable fashion, the boundary surface has approximately the size of the wire cross section. There is the risk of embrittlement at this boundary surface and the risk of an increase in the electrical resistance as a consequence of oxygen enhancement, pore formation, inadequate recrystallization, etc. The relatively small boundary surface yields a lower mechanical and electrical stability of the laser-welded connection in comparison to a soldered connection wherein the wire is embedded in the solder with an unmodified cross section.

Also included in the problem area of laser welding is that the lacquer of solderable copper lacquer wires (for example, on a polyurethane basis) does not complicate the welding or even assists it in that it acts as a fluxing agent, but the lacquer of the copper lacquer wires which are difficult to solder (for example, on a polyamide basis) and that are required for SMD coils, leads to poor welding results. By contrast to resistance and ultrasound welding, laser emission ultimately exerts no mechanical pressure onto the members to be welded. The members to be welded, however, must touch one another since a gap between the members to be welded deteriorates the welding results.

SUMMARY OF THE INVENTION

An object of the present invention is to specify an improved method of the type initially cited that, in particular, leads to a high-temperature-resistant contacting with improved mechanical and electrical stability on the basis of reduced wire deformation, and also leads to miniaturized dimensions of components manufactured without a sandwich technique by using direct joining of wire and terminal elements.

For achieving this object, the method of the invention of the type initially cited is characterized in that only the terminal element is melted to form a welding spot by direct laser irradiation at the location provided for welding, the wire being subsequently embedded thereinto as soon as the welding spot has cooled to an extent that the wire subsequently melts only superficially.

In energy application by direct laser irradiation, the melted terminal material is heated far above the melting point. The invention is based on the perception that the energy stored in the melt is adequate in order to heat the relatively minute wire material indirectly and without further direct or indirect laser irradiation to such an extent as needed for the welding process. This opens up the possibility of not melting the wire during welding in that the unheated wire is only dipped into the melt of the terminal material when the melt has lost so much energy due to heat elimination that the energy remaining in the melt is just adequate to superficially melt the wire.

An especially advantageous development of the method of the invention derives during the course of continuous, particularly standstill-free winding of winding carriers of electrical components in that the insulated winding wire is wound into the welding spot produced on the respective terminal element of the winding carrier and is thereby pressed by the winding tension into the solidifying melt to form the welded connection.

Further advantageous developments of the invention are the subject matter of additional claims.

DESCRIPTION OF THE PREFERRED EMBODIMENTS

Figure 1:
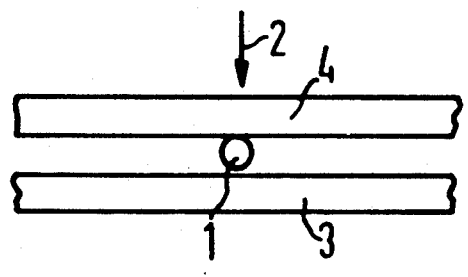
FIG. 1 is a schematic illustration of those parts required for the laser welding process of the prior art.

FIG. 1 shows the sandwich technique when Welding with a laser beam 2 that is known from the prior art. As indicated in FIG. 1, it is thereby provided that a cover lamina 4 presses the wire 1 down onto the provided welding location of the terminal element 3. In the known method, the wire 1 can also be removed from direct irradiation by, for example, overlapping material of the terminal element that serves as a covering, instead of being protected by a separate cover lamina 4. In any case, this requires additional work steps and leads to larger dimensions of the contacted component.

Figure 2:
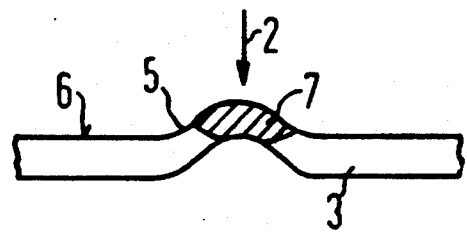
FIGS. 2 and 3 are schematic illustrations of two embodiments of the method of the invention.
Figure 3:
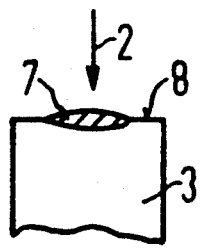

FIG. 2 shows a convex part 5 of the terminal surface 6 of a terminal element 3, whereas FIG. 3 shows a sectional surface 8 of a terminal element 3. It is advantageous to produce a welding spot 7 with the laser beam 2 either in a convex part 5 or at a section surface 8 of the respective terminal element 3, as shown in FIGS. 2 and 3, so that the welding pressure is produced, for example, by the forces exerted onto the winding wire by the winding tension instead of being produced, as previously, by dies and mechanical pressure.

The laser welding method of the invention enables the welding of a copper microlacquer wire that is difficult to solder and is heat resistant. The energy that is required for the melting or carbonization of the wire lacquer is supplied to the lacquer in the joining zone, not from the wire, but from the welding spot. The removal of the lacquer insulation that is critical for the quality of the contacting can therefore occur with a defined energy application. Added thereto is that the afore-mentioned welding pressure reduces the gap formation and promotes the break-out or channelling by the carbonized residues of the wire lacquer that is difficult to solder and that is required for an electrically stable welded connection. A general advantage of the welding method of the invention is also comprised therein that the wire surface that is only superficially melted enlarges the critical boundary surface between the wire and the melt. The energy application, moreover, can unproblematically occur with, for example, a pulsed solid-state laser (Nd-glass or Nd-YAG laser).

The method of the invention can be employed in the course of continuous winding of winding carriers of electrical components, whereby the winding carriers are supplied sequentially and step-by-step to a winding mechanism with a conveyor means, are wound and conveyed further, and whereby the wire is respectively welded fast at the terminal elements of the winding carriers and the winding wire is separated between successive electrical components. Such a winding method is inherently known from German Published Application 35 18 651. In this case, the insulated winding wire is wound into the welding spot produced on the respective terminal element and is thereby pressed by the winding tension into the melt that solidifies to form the welded connection. The time between the production of the welding spot and the wound introduction of the winding wire into the solidifying melt is set by the parameters defining the winding process (for example, start of winding, winding length, winding rate, etc.) which are particularly dependent on the wire diameter and on the wire lacquering, in such a way, that winding wire only superficially melts, but does not entirely melt. By selecting the geometrical position of the welding spots on the terminal elements moreover, a simple variation of the length of the winding wire, and thus an unproblematical setting of the corresponding nominal induction value of an electrical coil, is possible. This helps in meeting the tolerances required by the customers.

Figure 4:
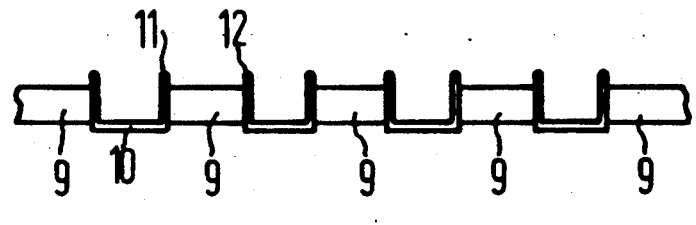
FIG. 4 is a schematic side view of a plurality of winding carriers connected to one another by double terminal elements.

For illustrating the contacting during the course of continuous winding of winding carriers, FIG. 4 shows respective double terminal elements 10 designed in U-shaped fashion which are respectively secured at end faces to two neighboring winding carriers 9 having a rectangular cross section. These double terminal elements 10 serve as system carriers for the winding carriers 9 during the work steps of winding, extrusion-coating, etc. Subsequently, the double terminal elements 10 are parted in the middle into terminal elements belonging to different winding carriers 9. Welding spots 11 and 12 produced according to the method of the invention are respectively indicated at the section surfaces of the two U-shaped legs of the double terminal elements 10 which are directed to the upper side of the winding carrier 9, but project there beyond. Thus, ultimately deriving during manufacture is a wound coil whose winding wire is respectively welded fast directly by laser irradiation, and is welded to the two terminal parts projecting beyond the carrier member without cover lamina or the like.

Compared to the method disclosed by German Published Application 35 18 651 that provides a (multiply coated) high-grade metallic carrier band having arms applied thereto at an angle as an additional system carrier, the inventive manufacture of surface mountable coils without a system carrier makes an elimination of terminal material possible that corresponds to approximately 20% of the material costs of the component. Given standstill-free winding—by contrast to German Published Application 35 18 651, however, the carrier members 9 cannot be brought through the orbit of the winding fingers into a winding position. Instead, the carrier members 9 are situated in the axis perpendicularly and centrally relative to the orbit and are also brought into a winding position by being conveyed in the direction of this axis, whereby the carrier members 9 are conveyed in unwound fashion through the axis of the supply reel for the winding wire.

Figure 5:
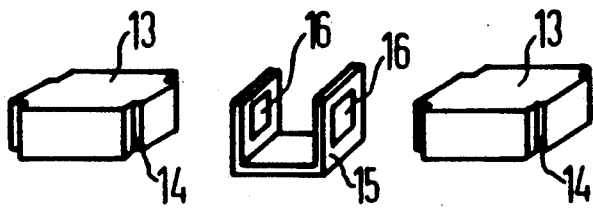
FIG. 5 is a perspective illustration of winding carrier and terminal element shapes specifically employed in the method of the invention.

Before the winding, the double terminal elements 10 must be joined to the carrier members 9, for example with glue. Until the glue hardens, the former would therefore have to be held in gluing position; this can be carried out on the basis of specific holding mechanisms. These, however, can deteriorate the appearance and the solderability of the surface of the terminal elements. The advantageous employment of the double terminal element 15 shown in FIG. 5 thereby lies at hand within the framework of the method of the invention, wherein the two U-shaped legs of this double terminal element 15 have window-like recesses 16 which accept the correspondingly shaped end faces 14 of the neighboring winding carriers 13. Thus, the double terminal element 15 is secured to the winding carriers 13 with glue and is carried during the hardening of the glue by the winding carriers 13 held by a conveyor mechanism. Potential auxiliary mounts are thus superfluous and an easier handling in the manufacture of the wound components results overall.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for automated manufacture of wound electrical components wherein thin insulating wires are attached to terminal elements, comprising the steps of:
   by laser welding, melting only the terminal element so as to form a welding spot by direct laser irradiation at a location desired for the welding; and
   subsequently embedding the wire into the welding spot as soon as the welding spot has cooled to such an extent that the wire subsequently melts only superficially.

2. A method according to claim 1 including the step of providing the wire being welded as a copper microlacquer wire which is relatively difficult to solder and is heat resistant.

3. A method according to claim 1 including the step of producing the welding spot at a convex portion of the respective terminal element.

4. A method according to claim 1 including the step of producing the welding spot at a section surface of the respective terminal element.

5. A method for automated manufacture of wound electrical components wherein wires of the electrical components are to be welded to respective terminal elements, comprising the steps of:
   providing a continuous standstill-free winding of winding carriers for the wound electrical components wherein the winding carriers are supplied sequentially and step-by-step to a winding mechanism with a conveyor where they are wound and further conveyed;
   welding respective wires of each winding to the respective terminal elements of the winding carriers by first providing a welding spot at a desired location on the respective terminal element by direct laser irradiation, and thereafter embedding the wire into the welding spot as soon as the welding spot has cooled to such an extend that the wire subsequently melts only superficially; and
   embedding the wire in the welding spot as it is cooling by a winding tension by winding the wire into the welding spot, the weld being formed as the melt thereafter solidifies to form a welded connection.

6. A method according to claim 5 wherein the wire comprises a thin insulated wire.

7. A method according to claim 5 including the step of parting the winding wire between two successive electrical components.

8. A method according to claim 5 wherein the time between the production of the welding spot and the winding of the winding wire into the solidifying melt is set by parameters which define the winding process such that the winding wire will only melt superficially.

9. A method according to claim 5 including the steps of setting a different winding wire length and a corresponding nominal induction value of the wound electrical component via a selection of a geometrical position of the welding spots on the respective terminal elements.

10. A method according to claim 5 including the steps of employing double terminal elements designed in a U-shape which are respectively secured at end faces to two neighboring winding carriers having a rectangular cross section so as to provide a system carrier for the winding carriers, and wherein a welding spot is respectively produced at section surfaces of two U-shaped legs of the double terminal element which point toward an upper side of the winding carriers and which project beyond the winding carriers.

11. A method according to claim 10 wherein the U-shaped legs have window-like recesses which accept correspondingly shaped end faces of the neighboring winding carriers, and wherein the double terminal element is secured to the winding carriers with glue and is held during hardening of the glue by the winding carriers held by a conveyor.

12. A method for contacting thin insulated wires of wound electrical components to terminal elements, comprising the steps of:
   melting the terminal element at a location at which the weld is to be performed so as to form a welding spot by direct laser irradiation; and
   as soon as the welding spot has cooled to such an extent that the wire subsequently melts only superficially, embedding the wire into the welding spot.

13. A method for automated manufacture of wound electrical components wherein wires of the electrical components are to be welded to respective terminal elements, comprising steps of:
   providing a winding carrier with a respective terminal element;
   winding the wire onto the winding carrier;
   welding respective wires of the winding to the respective terminal elements by providing a welding spot at a desired location on the respective terminal elements by direct laser irradiation, and thereafter embedding the wire into the welding spot as soon as the welding spot has cooled to such an extent that the wire subsequently melts only superficially; and when embedding the wire in the welding spot, utilizing a winding tension by winding the wire into the welding spot.

14. A method for automated manufacture of wound electrical components wherein wires of the electrical components are to be welded to respective terminal elements, comprising the steps of:

providing a series of winding carriers interconnected by terminal elements;

winding wire onto the winding carriers;

welding respective wires of each winding to the respective terminal elements of the winding carriers by first providing a welding spot at a desired location on the respective terminal element by direct laser irradiation, and thereafter embedding the wire into the welding spot as soon as the welding spot is cooled to such an extent that the wire subsequently melts only superficially;

embedding the wire in the welding spot as it is cooling by a winding tension by winding the wire into the welding spot; and cutting the winding carriers apart at each of the terminal elements.

* * * * *